United States Patent
Hanks et al.

(10) Patent No.: US 7,585,448 B2
(45) Date of Patent: Sep. 8, 2009

(54) TUBE INDUCED DEFORMITY ELIMINATION PROCESS

(75) Inventors: Dennis J. Hanks, Enumclaw, WA (US); Jack A. Woods, Kent, WA (US); Kate J. Felde, Seattle, WA (US)

(73) Assignee: The Boeing Company, Chicago, IL (US)

( * ) Notice: Subject to any disclaimer, the term of this patent is extended or adjusted under 35 U.S.C. 154(b) by 422 days.

(21) Appl. No.: 11/529,638

(22) Filed: Sep. 28, 2006

(65) Prior Publication Data

US 2008/0079193 A1 Apr. 3, 2008

(51) Int. Cl.
*B29C 70/44* (2006.01)

(52) U.S. Cl. .................. 264/316; 264/257; 264/510; 264/571

(58) Field of Classification Search .......... 264/316, 264/510, 571, DIG. 78
See application file for complete search history.

(56) References Cited

U.S. PATENT DOCUMENTS

| | | | |
|---|---|---|---|
| 4,942,013 A | 7/1990 | Palmer et al. | |
| 5,601,852 A | 2/1997 | Seemann | |
| 6,872,340 B2 | 3/2005 | Cundiff et al. | |
| 2002/0022422 A1 | 2/2002 | Waldrop, III et al. | |
| 2005/0073076 A1 | 4/2005 | Woods et al. | |
| 2007/0057413 A1* | 3/2007 | Haney | 264/510 |

FOREIGN PATENT DOCUMENTS

WO    WO 03/101708 A1    12/2003

* cited by examiner

*Primary Examiner*—Joseph S. Del Sole
*Assistant Examiner*—Robert Dye

(57) ABSTRACT

The disclosure is directed to a process for producing resin infused composite parts having improved structural performance and improved surface appearance. The process comprises the steps of positioning a dry composite preform on a forming tool component, arranging resin exit lines in close proximity to the perform, placing a permeable release material on the perform, and placing a first piece of flow media over the release material. The process further comprises the steps of wrapping a resin distribution tube with a second piece of flow media, placing a vacuum bag layer over the forming tool component, preform, release material, first and second pieces of flow media and resin distribution tube, such that the resin distribution tube is retained in a pleat formed in the vacuum bag layer and such that a bagged preform is formed, and positioning the resin distribution tube above the bagged preform.

19 Claims, 3 Drawing Sheets

TUBE INDUCED DEFORMITY ELIMINATION PROCESS

BACKGROUND

1. Field

The disclosure relates to a process for making composite parts. In particular, the disclosure relates to a vacuum resin infusion for making fiber-reinforced resin composite parts.

2. Description of Related Art

Vacuum resin infusion is a process for making high quality composite parts used in the aerospace, automotive, marine, trucking, rail, defense, and other industries. Composite parts manufactured with known vacuum resin processes have a high strength and stiffness, are resistant to fatigue and chemical attack, and are corrosion-free or corrosion-resistant. Such a known vacuum resin infusion process is the controlled atmospheric pressure resin infusion (CAPRI) process. FIG. 1 is a schematic drawing of the known CAPRI process. In this process, as shown in FIG. 1, a reduced pressure vacuum is placed on an inlet reservoir 10. A vacuum pump operating at the exit of a vacuum bag layer 14 reduces the pressure at the outlet to essentially full vacuum to create a driving force between the inlet reservoir and an outlet vacuum reservoir 12. The pressure on the resin in the inlet reservoir pushes the resin into the vacuum bag layer 14 where a preform 16 of dry reinforcing fibers sits on a mold surface with appropriate release plies. Resin entering the vacuum bag layer 14 flows into a resin distribution tube 18 that carries the resin over the preform 16 and over a porous peel ply 20. The resin flows through the peel ply 20 down into the preform, moving from the inlet toward the outlet. During infusion, pressure in the vacuum bag layer will increase from essentially full vacuum to about the pressure of the inlet reservoir. For large composite parts, numerous resin distribution tubes must be used. Where the resin distribution tube contacts the surface of the preform, surface deformation or mark-off occurs because of the vacuum pressure on the resin distribution tube into the preform.

FIG. 2 is a close-up perspective view of a known resin distribution tube 22 used in known resin infusion processes, in which the resin distribution tube 22 sits on the surface of a preform 24, layered with a release material 26 and a flow media 28, and causes deformation of the preform. Such deformation or mark-off not only causes a visual defect in the composite part but also causes a physical distortion of the dry reinforcing fibers in the preform. Such physical distortion can affect the mechanical performance of the composite part, including such mechanical performance properties as tensile properties and compression properties. A known approach used to address the deformation is to attempt to distribute the pressure of the resin distribution tube over a larger area, such as the known apparatus shown in FIG. 3, which shows a front sectional view of a known resin distribution tube 30 that uses a wide base 32 with an opening 34 along the bottom for transfer of resin from the resin distribution tube 30 to a preform 36. However, although the use of a wider area may reduce the pressure in a concentrated area, the deformation or mark-off problem is merely transferred to a wider area because there is still direct contact between the resin distribution tube and the preform.

Accordingly, there is a need for an improved process that does not have the problems associated with known processes and devices.

SUMMARY

The disclosure satisfies this need for an improved process that is unique, nonobvious, and advantageous. Unlike known processes and devices, the process provides the following advantages: produces resin infused composite parts with improved structural performance and improved surface appearance and eliminates deformation on the surface of resin infused composite parts; places the resin distribution tube above and away from the preform surface such that the tube is not affected by the downward pressure of the atmosphere; provides for flow media that connects the resin distribution tube to the preform which allows for free movement of resin without direct contact of the resin distribution tube to the preform; provides for equal forces surrounding and acting on the resin distribution tube; provides a process that produces high quality composite parts that have a better appearance, require less rework, and are structurally sounder than parts produced with known resin infusion processes because of the elimination of fiber distortion with the process of the disclosure.

In one of the embodiments of the disclosure, there is provided a process for producing resin infused composite parts having improved structural performance and improved surface appearance. The process comprises the steps of positioning a dry composite preform on a forming tool component, arranging resin exit lines in close proximity to the preform; placing a permeable release material on the perform, and placing a first piece of flow media over the release material. The process further comprises the steps of wrapping a resin distribution tube with a second piece of flow media, placing a vacuum bag layer over the forming tool component, preform, release material, first and second pieces of flow media and resin distribution tube, such that the resin distribution tube is retained in a pleat formed in the vacuum bag layer and such that a bagged preform is formed, and positioning the resin distribution tube above the bagged preform, such that the resin distribution tube is not in contact with the bagged perform.

In another one of the embodiments of the disclosure, there is provided a process for producing resin infused composite parts having improved structural performance and improved surface appearance. The process comprises the steps of positioning a dry composite preform on a forming tool component, arranging resin exit lines in close proximity to the perform, placing a permeable release material on the perform, placing a first piece of flow media over the release material. The process further comprises the steps of wrapping a resin distribution tube with a second piece of flow media, placing a vacuum bag layer over the forming tool component, preform, release material, first and second pieces of flow media and resin distribution tube, such that the resin distribution tube is retained in a pleat formed in the vacuum bag layer and such that a bagged preform is formed, and positioning the resin distribution tube above the bagged preform, such that the resin distribution tube is not in contact with the bagged perform. The process further comprises the steps of infusing resin into the bagged preform through the resin distribution tube and first and second pieces of flow media and returning an excess resin to a reservoir, and curing the resin infused bagged perform.

In another embodiment of the disclosure, there is provided a process for producing resin infused composite parts having improved structural performance and improved surface appearance. The process comprises the steps of positioning a resin distribution tube used in a controlled atmospheric pressure resin vacuum infusion process above the surface of a preform layered with a permeable release material and a first piece of flow media, wrapping the resin distribution tube in a second piece of flow media, and wrapping and suspending the resin distribution tube in a pleat of a vacuum bag layer covering the preform and the resin distribution tube, such that the resin distribution tube is not in contact with the preform.

BRIEF DESCRIPTION OF THE DRAWINGS

The foregoing and other advantages and features of the disclosure, and the manner in which the same are accomplished, will become more readily apparent upon consideration of the following detailed description of the disclosure taken in conjunction with the accompanying drawings which illustrate preferred and exemplary embodiments, but which are not necessarily drawn to scale, wherein.

DETAILED DESCRIPTION

The disclosure now will be described more fully hereinafter with reference to the accompanying drawings, in which some, but not all embodiments of the disclosure are shown. Indeed, this disclosure may be embodied in several-different forms and should not be construed as limited to the embodiments set forth herein. Rather, these embodiments are provided so that this disclosure will be thorough and complete and will fully convey the scope of the disclosure to those skilled in the art. Like numbers refer to like elements throughout.

Figure 1:
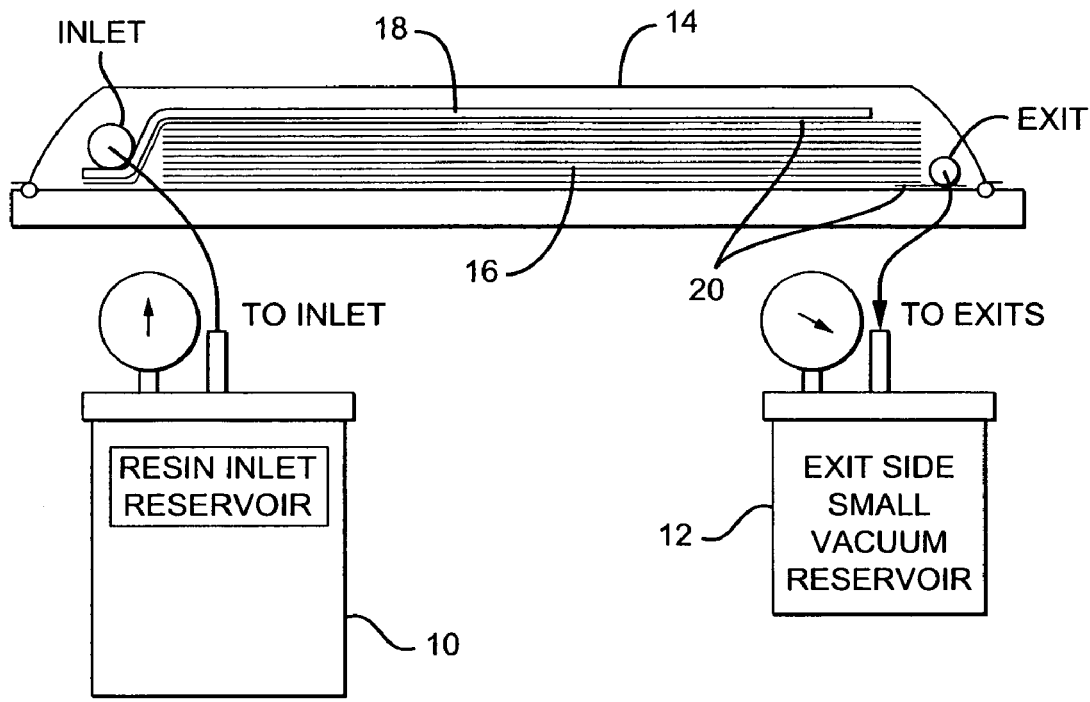
FIG. 1 is an illustration of a schematic drawing of the prior art CAPRI (controlled atmospheric pressure resin infusion) process.
Figure 2:
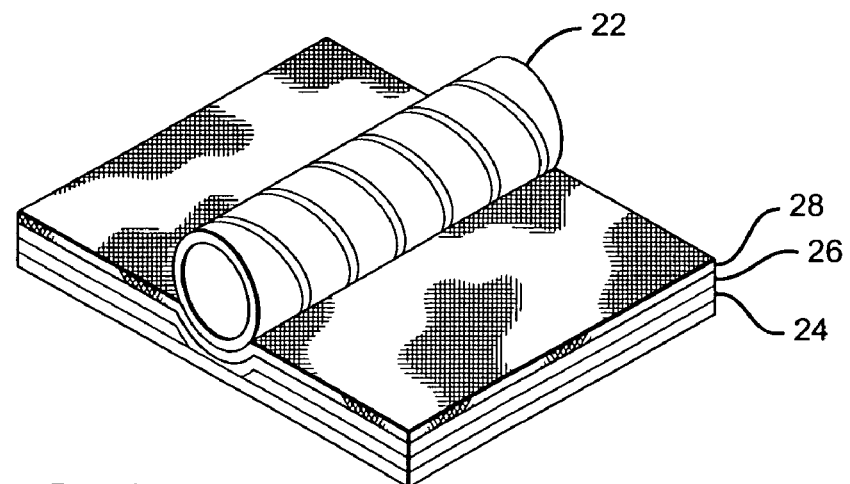
FIG. 2 is an illustration of a close-up perspective view of a prior art resin distribution tube used in the CAPRI (controlled atmospheric pressure resin infusion) process.
Figure 3:
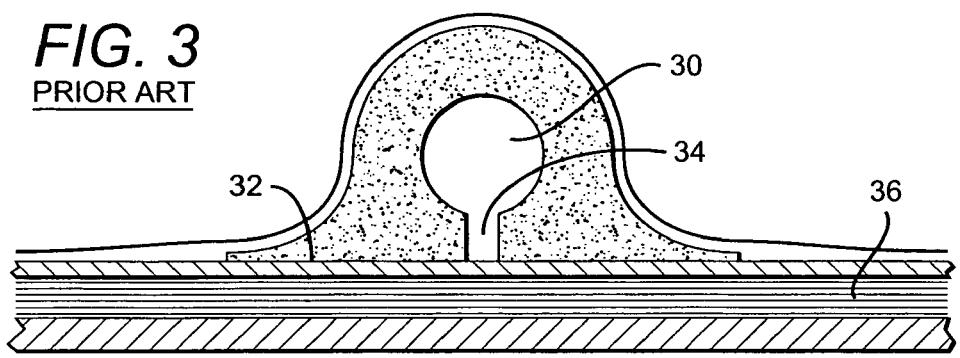
FIG. 3 is an illustration of a front sectional view of another prior art distribution tube configuration.
Figure 4:
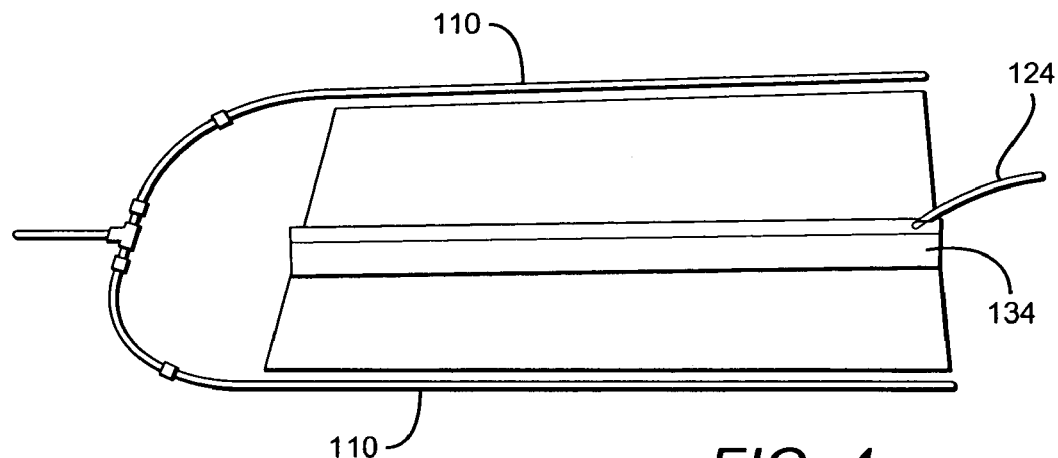
FIG. 4 is an illustration of a top view of an embodiment of the process of the disclosure.
Figure 5:
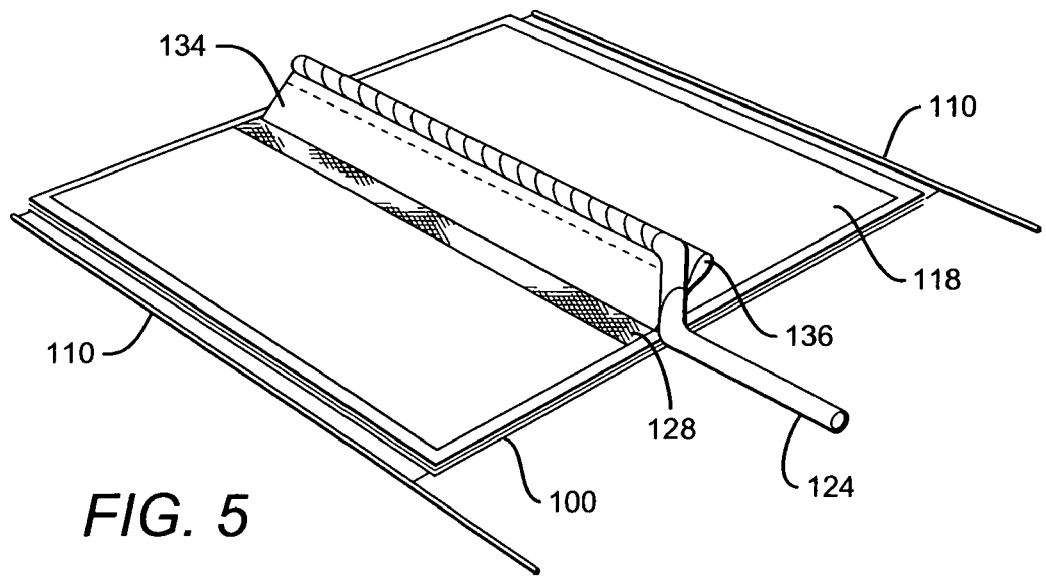
FIG. 5 is an illustration of a perspective view of an embodiment of the process of the disclosure.
Figure 6:
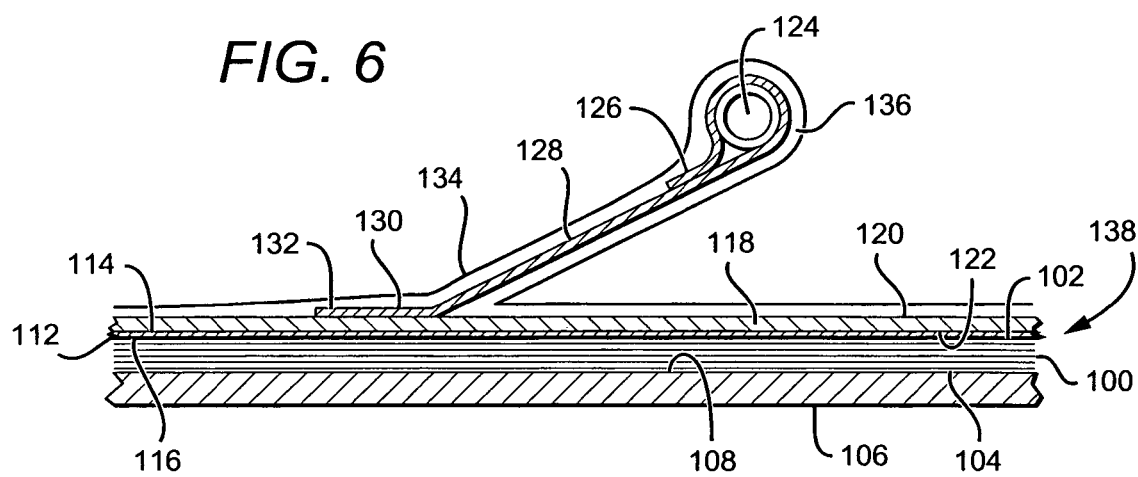
FIG. 6 is an illustration of a front sectional view of the process of FIG. 5.

Referring to the FIGS., FIG. 4 is an illustration of a top view of one of the embodiments of the tube induced deformity elimination (TIDE) process of the disclosure. FIG. 5 is an illustration of a perspective view of the one of the embodiments of the process of the disclosure. FIG. 6 is an illustration of a front sectional view of the process of FIG. 5. The disclosure provides for a process for producing resin infused composite parts having improved structural performance and improved surface appearance. Referring to FIG. 6, the first step of the process comprises positioning a dry composite preform 100 having a top surface 102 and a bottom surface 104 on a forming tool component 106. The bottom surface 104 of the preform 100 is positioned over a top surface 108 of the forming tool component 106. Preferably, the preform comprises carbon fibers, glass fibers, aramid fibers, or other fibrous materials. More preferably, for high performance uses, the preform comprises carbon fibers. Preferably, the forming tool component is a machined or otherwise formed or molded solid tool having vacuum integrity, such as a mandrel or flat plate. Referring to FIGS. 4 and 5, the process of the disclosure further comprises the step of arranging resin exit lines 110 in close proximity to the preform 100. The number of resin exit lines is determined by the size and geometry of the composite part being built with the actual number of lines only being restricted by the practical limitation of fabricating and serving a high number of lines, i.e., greater than one hundred (100) lines. Referring to FIG. 6, the process of the disclosure further comprises the step of placing a permeable release material 112 having a top surface 114 and a bottom surface 116 on the preform. The bottom surface 116 of the release material 112 is placed over the top surface 102 of the preform 100. Preferably, the permeable release material is made of a material comprising permeable thermoplastics, coated woven glasses, coated woven carbons, or other suitable permeable non-bonding materials.

Referring to FIG. 6, the process of the disclosure further comprises the step of placing a first piece of flow media 118 having a top surface 120 and a bottom surface 122 over the release material 112. The bottom surface of the first piece of flow media is placed over the top surface of the release material 112. Preferably, the flow media comprises plastic mesh, metal mesh, plastic netting, or metal netting. The process of the disclosure further comprises the step of wrapping a resin distribution tube 124 with a first end 126 of a second piece of flow media 128 and leaving a second end 130 of the of the second piece of flow media 128 extending radially along the length of the tube 124. The resin distribution tube is used to transfer the resin and can also be referred to as a resin inlet line. Preferably, the resin distribution tube is porous and is made of a material comprising nylon, polyethylene, polypropylene, polytetrafluoroethylene, or coiled metal wire. Preferably, the resin distribution tube is a spiral cut tube. The resin distribution tube is wrapped in a piece or strip of flow media, preferably plastic mesh or plastic netting. The second piece of flow media is attached to the resin distribution tube at the first end of the flow media, and the second end of the flow media is free to be fastened or taped to the flow media already coupled to the preform. The second piece or strip of flow media is preferably about three and one-half inches (3½") wide. A wider strip of about five inches (5") can be used if two plies of the second piece of flow media are desired to be used to attach the resin distribution-tube to the first piece of flow media-on the preform. This would allow for a greater volume of resin to flow if that is desired.

As shown in FIG. 6, the process of the disclosure further comprises the step of coupling a portion 132 of the second end 130 of the second piece of flow media 128 to the first piece of flow media 118 already placed on the preform 100. The process of the disclosure further comprises the step of placing a vacuum bag layer 134 over the forming tool component 106, preform 100, release material 112, first and second pieces of flow media 118, 128, and resin distribution tube 124, such that the resin, distribution tube 124 is retained in a pleat 136 formed in the vacuum bag layer 134 and such that a bagged preform 138 is formed (see FIG. 6). The resin distribution tube 124 is supported in place a distance above the bagged preform 138, and the resin distribution tube 124 is not in physical contact with the bagged perform 138. Preferably, the resin distribution tube is from about 0.5 inches to about 6 inches above the bagged preform. However, the resin distribution tube may also be other suitable distances above the bagged preform as long as it is not touching the surface of the composite part. Preferably, the vacuum bag layer is made of a material comprising nylon film or other material than can withstand the curing temperature of the resin infused into the preform. When the vacuum bag layer is applied during the layup of the preform, the resin distribution tube and flow media are captured in the pleat. The pleat provides a channel to direct the resin and gives stiffness to the resin distribution tube and first and second pieces of flow media when the bagged preform is evacuated. Thus, the vacuum bag layer holds the resin distribution tube in place. The positioning of the resin distribution tube in the pleat of the vacuum bag layer causes the pressure forces of the vacuum bag layer to be around the resin distribution tube rather than in a downward direction toward the preform. This removes the pressure from the preform surface.

The process of the disclosure further comprises the step of positioning the resin distribution tube 124 above the bagged perform 138, such that the second end 130 of the second piece of flow media 128 contacts the top surface 120 of the first piece of flow media 118 on the bagged preform 138 at an angle less than perpendicular to the bagged preform and indirectly connects the resin distribution tube 124 to the bagged preform and suspends the resin distribution tube above the bagged preform at an angle less then perpendicular to the bagged preform. Preferably, the resin distribution tube is positioned above the bagged preform at an angle of about 45 degrees to the top surface of the bagged preform. The resin distribution tube is connected to the bagged preform by the second piece of flow media which serves as a path for the resin. The process of this embodiment of the disclosure may further comprise the step, after the last step of positioning the resin distribution tube, of infusing resin into the bagged preform through the resin distribution tube and first and second pieces of flow media and returning an excess resin to a reservoir (not shown). In addition, the process of this embodiment of the disclosure may further comprise the step, after the infusing resin into the bagged preform, of curing the resin infused bagged preform. Preferably, the temperature for curing the resin infused bagged preform is from about room temperature to about 350 degrees Fahrenheit. However, higher temperature curing resins can also be used with the invention, including thermoset curing resins. The process of this embodiment of the disclosure is carried out via a tube induced deformity elimination apparatus that eliminates surface deformations on resin infused composite parts.

Figure 7:
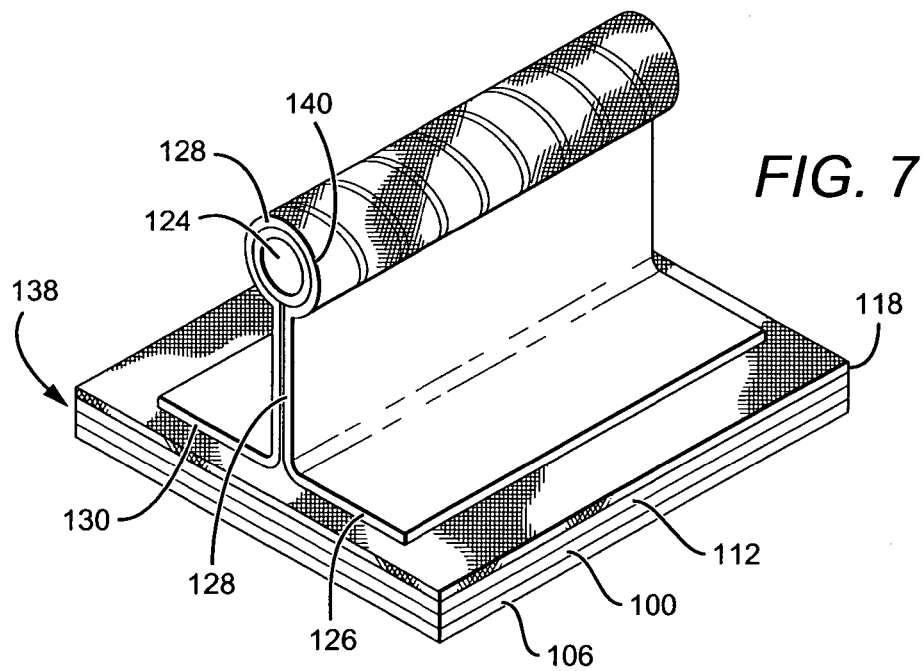
FIG. 7 is an illustration of a perspective view of another embodiment of the resin distribution tube and bagged preform of the process of the disclosure; and, FIG. 8 is an illustration of a front sectional view of the resin distribution tube of FIG. 7.
Figure 8:
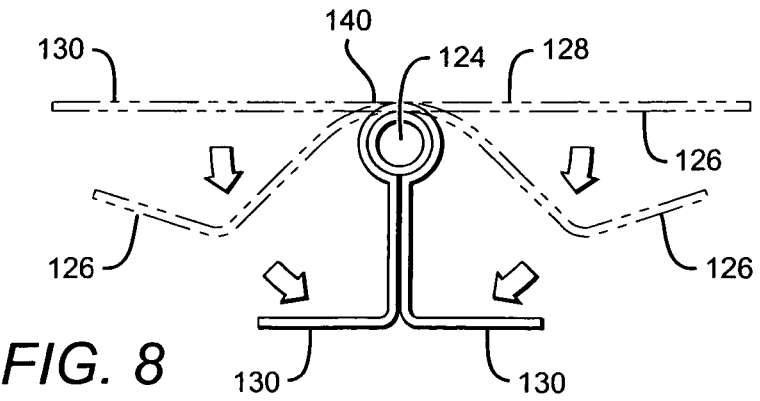

In another one of the embodiments of the disclosure a process is provided for producing resin infused composite parts having improved structural performance and improved surface appearance in which the resin distribution tube 124 is suspended above the preform 100 and is perpendicular to the preform rather than at an angle less than perpendicular to the preform. FIG. 7 is an illustration of a perspective view of this embodiment of the TIDE process of the disclosure, and FIG. 8 is an illustration of a front sectional view of the resin distribution tube of FIG. 7. The first step of the process of this embodiment comprises positioning the dry composite preform 100 having a top surface 102 and a bottom surface 104 on a forming tool component 106, wherein the bottom surface 104 of the preform 100 is positioned over a top surface 108 of the forming tool component 106. The process of this embodiment further comprises arranging resin exit lines 110 in close proximity to the preform 100, placing a permeable release material 112 over the top surface 108 of the preform 100, and placing a first piece of flow media 118 over the top surface 114 of the release material 112. The process of this embodiment further comprises the step of wrapping a resin distribution tube 124 with a middle portion 140 of a second piece of flow media 128 and coupling a first end 126 of the second piece of flow media 128 and a second end 130 of the second piece of flow media 128 to the first piece of flow media 118 already placed on the preform 100, such that each of the first and second ends forms a ninety degree angle to the resin distribution tube. The process of this embodiment further comprises placing a vacuum bag layer 134 over the forming tool component 106, preform 100, release material 112, first and second pieces of flow media 118, 128 and resin distribution tube 124, such that the resin distribution tube is retained in a pleat 136 formed in the vacuum bag layer 134 and such that a bagged preform 138 is formed. The resin distribution tube is supported in place a distance above the bagged preform and the resin distribution tube is not in physical contact with the bagged perform. The process of this embodiment further comprises positioning the resin distribution tube 124 above the bagged preform, such that each of the first and second ends of the second piece of flow media contacts the top surface of the first flow media on the bagged preform and connects the resin distribution tube to and above the bagged preform at a ninety degree angle to the bagged preform. Preferably, the resin distribution tube is from about 0.5 inches to about 6 inches above the bagged preform. However, the resin distribution tube may also be other suitable distances above the bagged preform as long as it is not touching the surface of the composite part.

The process of this embodiment of the disclosure may further comprise the step, after the last step of positioning the resin distribution tube, of infusing resin into the bagged preform through the resin distribution tube and first and second pieces of flow media and returning an excess resin to a reservoir (not shown). In addition, the process of this embodiment of the disclosure may further comprise the step, after the infusing resin into the bagged preform, of curing the resin infused bagged preform. Preferably, the temperature for curing the resin infused vacuum bag layer is from room temperature to about 350 degrees Fahrenheit. However, higher temperature curing resins can also be used with the disclosure, including thermoset curing resins. The process of this embodiment of the disclosure is carried out via a tube induced deformity elimination apparatus that eliminates surface deformations on resin infused composite parts.

The process of the invention produces resin infused composite parts having improved structural performance and improved surface appearance by eliminating the deformations or mark-offs on the preforms, which become the composite parts, because it moves the resin distribution tube away from the bagged preform surface. By moving the resin distribution tube away from the bagged preform surface, the resin, distribution tube is not affected by the downward pressure of the atmosphere. Flow media indirectly connects the resin distribution tube to the bagged preform which allows for free movement of resin without direct contact of the resin distribution tube to the bagged preform and thus eliminates preform deformity that can be caused by direct contact of the resin distribution tube to the bagged preform. The advantages of the embodiments of the disclosure over known resin infusion processes include production of higher quality composite parts that have a better appearance, require less rework, and are structurally sounder because of the elimination of fiber distortion.

Many modifications and other embodiments of the disclosure will come to mind to one skilled in the art to which this disclosure pertains having the benefit of the teachings presented in the foregoing descriptions and the associated drawings. Therefore, it is to be understood that the invention is not to be limited to the specific embodiments disclosed that modifications and other embodiments are intended to be included within the scope of the appended claims. Although specific terms are employed herein, they are used in a generic and descriptive sense only and not for purposes of limitation.

What is claimed is:

1. A process for producing resin infused composite parts having improved structural performance and improved surface appearance, the process comprising the steps of:
   positioning a dry composite preform on a forming tool component;
   arranging resin exit lines in close proximity to the preform;
   placing a permeable release material on the preform;
   placing a first piece of flow media over the release material;
   wrapping a resin distribution tube with a second piece of flow media;
   placing a vacuum bag layer over the forming tool component, preform, release material, first and second pieces of flow media and resin distribution tube, such that the resin distribution tube is retained in a pleat formed in the vacuum bag layer and such that a bagged preform is formed; and,
   positioning the resin distribution tube above the bagged preform, such that the resin distribution tube is not in contact with the bagged preform.

2. The process of claim 1 further comprising the step, after the last step of positioning the resin distribution tube, of infusing resin into the bagged preform through the resin distribution tube and first and second pieces of flow media and returning an excess resin to a reservoir.

3. The process of claim 1 wherein the preform is selected from the group comprising carbon fibers, glass fibers, and aramid fibers.

4. The process of claim 1 wherein the forming tool component is a molded solid tool having vacuum integrity.

5. The process of claim 1 wherein the permeable release material is selected from the group comprising thermoplastics, coated woven glasses, and coated woven carbons.

6. The process of claim 1 wherein the flow media is selected from the group comprising plastic mesh, metal mesh, plastic netting, and metal netting.

7. The process of claim 1 wherein the resin distribution tube is porous and is made of a material selected from the group comprising nylon, polyethylene, polypropylene, polytetrafluoroethylene, and coiled metal wire.

8. The process of claim 1 wherein the resin distribution tube is positioned above the bagged preform at an angle of about 90 degrees to the bagged preform.

9. The process of claim 1 wherein the resin distribution tube is positioned above the bagged preform at an angle less than perpendicular to the bagged preform.

10. A process for producing resin infused composite parts having improved structural performance and improved surface appearance, the process comprising the steps of:
    positioning a dry composite preform on a forming tool component;
    arranging resin exit lines in close proximity to the preform;
    placing a permeable release material on the preform;
    placing a first piece of flow media over the release material;
    wrapping a resin distribution tube with a second piece of flow media;
    placing a vacuum bag layer over the forming tool component, preform, release material, first and second pieces of flow media and resin distribution tube, such that the resin distribution tube is retained in a pleat formed in the vacuum bag layer and such that a bagged preform is formed;
    positioning the resin distribution tube above the bagged preform, such that the resin distribution tube is not in contact with the bagged preform;
    infusing resin into the bagged preform through the resin distribution tube and first and second pieces of flow media and returning an excess resin to a reservoir; and,
    curing the resin infused bagged perform.

11. The process of claim 10 wherein the resin distribution tube is positioned above the bagged preform at an angle of about 90 degrees to the bagged preform.

12. The process of claim 10 wherein the resin distribution tube is positioned above the bagged preform at an angle less than perpendicular to the bagged preform.

13. The process of claim 10 wherein the preform is selected from the group comprising carbon fibers, glass fibers, and aramid fibers.

14. The process of claim 10 wherein the forming tool component is a molded solid tool having vacuum integrity.

15. The process of claim 10 wherein the permeable release material is selected from the group comprising thermoplastics, coated woven glasses, and coated woven carbons.

16. The process of claim 10 wherein the flow media is selected from the group comprising plastic mesh, metal mesh, plastic netting, and metal netting.

17. The process of claim 10 wherein the resin distribution tube is porous and is made of a material selected from the group comprising nylon, polyethylene, polypropylene, polytetrafluoroethylene, and coiled metal wire.

18. The process of claim 10 wherein the process is carried out via a tube induced deformity elimination apparatus.

19. A process for producing resin infused composite parts having improved structural performance and improved surface appearance, the process comprising the steps of:
    positioning a resin distribution tube used in a controlled atmospheric pressure resin vacuum infusion process above the surface of a preform layered with a permeable release material and a first piece of flow media;
    wrapping the resin distribution tube in a second piece of flow media; and,
    wrapping and suspending the resin distribution tube in a pleat of a vacuum bag layer covering the preform and the resin distribution tube, such that the resin distribution tube is not in contact with the preform.

* * * * *